(12) United States Patent
Dubin et al.

(10) Patent No.: US 7,198,370 B2
(45) Date of Patent: Apr. 3, 2007

(54) ILLUMINATION APPARATUS

(75) Inventors: Matthew B. Dubin, Tucson, AZ (US); Brent D. Larson, Cave Creek, AZ (US)

(73) Assignee: Honeywell International, Inc., Morristown, NJ (US)

( * ) Notice: Subject to any disclaimer, the term of this patent is extended or adjusted under 35 U.S.C. 154(b) by 227 days.

(21) Appl. No.: 10/930,418

(22) Filed: Aug. 30, 2004

(65) Prior Publication Data
US 2006/0044512 A1 Mar. 2, 2006

(51) Int. Cl.
G03B 21/14 (2006.01)
G03B 21/26 (2006.01)
G03B 21/20 (2006.01)
G03B 21/00 (2006.01)

(52) U.S. Cl. ............... 353/20; 353/89; 353/94; 353/102; 353/121

(58) Field of Classification Search ............ 353/20, 353/88, 89, 102, 8, 94, 121
See application file for complete search history.

(56) References Cited

U.S. PATENT DOCUMENTS 6,222,674 B1 * 4/2001 Ohta .................. 359/618
6,473,240 B1 * 10/2002 Dehmlow ............ 359/630
6,513,937 B1 * 2/2003 Dehmlow ............ 353/94
6,726,329 B2 * 4/2004 Li et al. .............. 353/20
7,055,965 B2 * 6/2006 Koba .................. 353/88
7,101,048 B2 * 9/2006 Travis ................. 353/69

* cited by examiner

Primary Examiner—Melissa Jan Koval
(74) Attorney, Agent, or Firm—Ingrassia Fisher & Lorenz

(57) ABSTRACT

An apparatus including a spatially modulated extended light source configured to project an output having at least one region of diminished illumination, and an array of polarizing beam splitters (PBSs) positioned proximal to the spatially modulated extended light source. The light source includes at least two light outputs configured to project unpolarized light; and at least one gap interspersed between the light outputs. The array of PBSs is configured to receive the output from the light source, convert the unpolarized light to light having a first polarized state, and remove the at least one region of diminished illumination. A method including splitting unpolarized light emitted from each light emission aperture of a spatially modulated extended light source into a first beam having a first polarized state and a second beam having a second polarized state, converting the second beam from the second polarized state to the first polarized state, and transmitting the first beam having the first polarized state and the second beam having the first polarized state.

21 Claims, 3 Drawing Sheets

ILLUMINATION APPARATUS

FIELD OF THE INVENTION

The present invention generally relates to illumination methods and apparatus, and more particularly relates to extended light sources.

BACKGROUND OF THE INVENTION

Many projection systems incorporate small image modulators that use relatively small light sources, which are commonly referred to as "point" sources. Examples of point sources include a laser and short-arc lamp. These small sources are generally used to maximize the amount of light which can be applied to a small image source or light valve. One common approach is to use short-arc, high intensity discharge lamps. While short-arc, high intensity discharge lamps have many desirable properties, some of the associated attributes make such lamps difficult to use. For example, arc lamps may not be desirable for use in heads-up displays (HUD), as well as avionics display designs in general. The thermal output and shorter lifetime typically associated with arc lamps make the arc lamps less than ideal for HUD applications. HUD design considerations additionally favor image sources that are not as small as those typically used in commercial projection systems. In addition, HUD applications present a further challenge of providing substantially high luminance.

One attractive light source is a fluorescent lamp. Fluorescent lamps are commonly used in avionics displays and have a relatively longer lifetime with relatively high efficiency. However, obtaining high luminance values that are generally needed for HUD systems is difficult using fluorescent lamps. One approach to address this shortcoming is to use aperture lamps. To increase luminance, aperture lamps use fluorescent lamps with each fluorescent lamp having a cavity construction forming an aperture to emit light. For example, a portion of a fluorescent tube may be covered with phosphor, and a remaining portion of the tube has a thin or absent layer of phosphor to form a relatively narrow region for emitting light therethrough. With aperture lamps, the light source appears as a narrow light-emitting stripe on a larger body and generally lacks uniformity of light output. A diffuser may be used to obtain a more uniform light output, but generally has a significant negative impact on system efficiency. Multiple aperture lamps aligned in parallel may also be used to backlight avionics displays while maintaining longer lifetime and relatively high efficiency, but gaps reside between the lit apertures and generally create non-uniformity.

Accordingly, it is desirable to provide a backlight for displays having high luminance, improved uniformity, and efficiency of light output. In addition, it is desirable to provide an extended light source having improved uniformity and efficiency of light output. Furthermore, other desirable features and characteristics of the present invention will become apparent from the subsequent detailed description of the invention and the appended claims, taken in conjunction with the accompanying drawings and this background of the invention.

BRIEF SUMMARY OF THE INVENTION

An apparatus is provided for illuminating displays. The apparatus includes a spatially modulated extended light source that emits an unpolarized light output and a polarization device positioned proximal to the extended light source that converts substantially all of the unpolarized light output to a single polarized state. Examples of spatially modulated extended light sources include aperture lamps, fluorescent lamps, and light emitting diode (LED) arrays, and apertured cavity backlight assemblies.

In one embodiment, the apparatus includes a spatially modulated extended light source projecting unpolarized light in a propagation direction, and an array of polarizing beam splitters (PBSs) positioned proximal to the light source in the propagation direction and receiving the unpolarized light. The array of PBSs transmits light having a single polarized state.

In another embodiment, the apparatus includes an avionics display having a spatially modulated extended light source generating unpolarized light, a plurality of beam splitters receiving the unpolarized light, a plurality of half-wave retarders, and a diffusing screen. Each of the plurality of beam splitters splits the unpolarized light into a first beam having a first polarized state and a second beam having a second polarized state, and the first beam passes through the beam splitter. Each of the plurality of retarders is coupled with a corresponding beam splitter of the plurality of beam splitters and converts the second polarized state of the second beam to the first polarized state. The diffusion screen receives the first beam from the plurality of beam splitters and the second beam from the plurality of half-wave retarders. The second beam from the plurality of half-wave retarders illuminates gaps that may be present in the spatially modulated extended light source.

A method is provided for illumination in displays. The method includes emitting unpolarized light from a spatially modulated extended light source, converting substantially all of the unpolarized light to a single polarization, illuminating the gaps of the spatially modulated extended light source, and transmitting the single polarized light to an imaging location.

BRIEF DESCRIPTION OF THE DRAWINGS

The present invention will hereinafter be described in conjunction with the following drawing figures, wherein like numerals denote like elements.

DETAILED DESCRIPTION OF THE INVENTION

The following detailed description of the invention is merely exemplary in nature and is not intended to limit the invention or the application and uses of the invention. Furthermore, there is no intention to be bound by any theory presented in the preceding background of the invention or the following detailed description of the invention.

According to various exemplary embodiments, an illumination apparatus is provided having a spatially modulated extended light source providing unpolarized light and optics positioned proximal or adjacent to the light source to convert the unpolarized light into light having a single polarized state. Gaps from the spatially modulated extended light source are substantially illuminated using such optics. The illumination apparatus may be used to provide a substantially uniform and efficient light source for displays. Additionally, the illumination apparatus is well-suited to avionics display applications that may use fluorescent lamps or aperture lamps.

Figure 1:
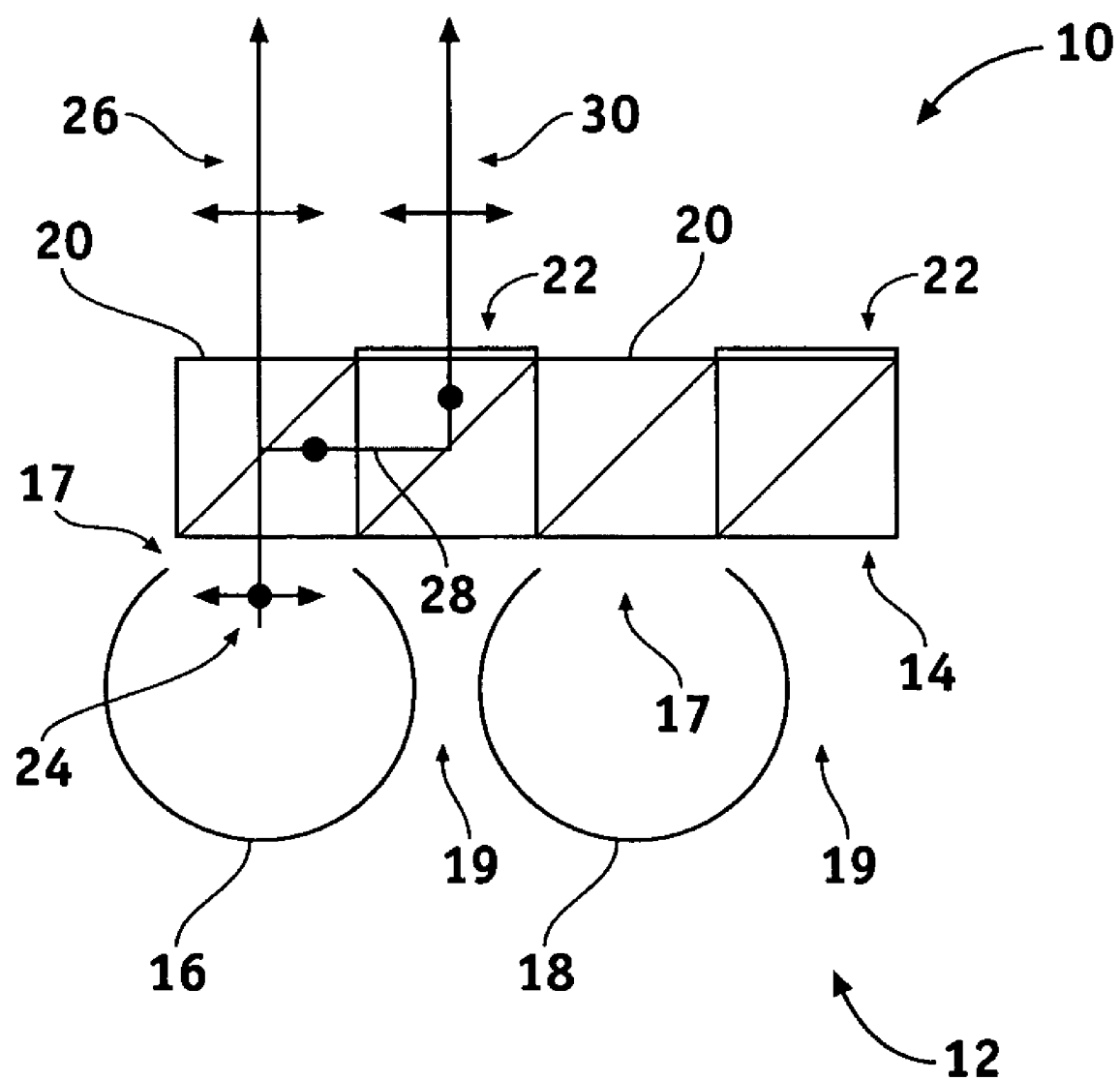
FIG. 1 is a schematic diagram of a first exemplary embodiment of an illumination apparatus.

Referring now to the drawings, FIG. 1 is a schematic diagram of a first exemplary embodiment of an illumination apparatus, shown generally at 10. The illumination apparatus 10 includes a spatially modulated extended light source 12 and a single-polarization transducer 14. The term "extended light source" is defined herein to be a light source that is extended in size from a conventional point source and that generally has an emission region extended both spatially and angularly with respect to an axis of light propagation. Examples of extended light sources include, but are not limited to, fluorescent lamps, aperture lamps, and arrays of relatively smaller light sources such as an array of light emitting diodes (LEDs). These sources are generally characterized by having both significant area and significant angular output from such area. Short arc and laser sources, by contrast, are generally characterized by either large angular output from a small area or volume, or have limited angular output from a larger area.

The term "spatially modulated" is used herein in the context of light sources and defined herein as a variation between at least two different levels such that regions of one level are interspersed between regions of other levels. Examples of spatially modulated light sources include, but are not limited to, an array of LEDs having gaps between each LED, an array of apertures having gaps between each aperture, and an array of lamps having gaps between each lamp. The modulation may be in one dimension, such as an array of stripes, or in two dimensions, such as an LED array.

The term "transducer" is defined herein to be a device that transforms a first distribution of radiation to another, second radiation distribution. A transducer may be a device that concentrates a distribution of radiation, or collimates a distribution of radiation, or in a general sense, transforms one distribution to a second specified distribution. The optical devices described herein are transducers.

For illustration purposes, ray tracings used in conjunction with the optical devices and the associated description may be described from a reference of an external source that supplies rays to the optical device, which are then focused by optical surfaces onto a receiver. It should be apparent that the optical devices can also operate in the reverse direction, as an emitter from a source that generates rays that are processed by the optical surfaces and then emitted in a predetermined shape with a predetermined divergence and intensity profile. In some instances, the figures represent the optical devices as a two-dimensional (2D) cross-sectional diagram that shows the optical surfaces, focal area, and other possibly other features. It should be understood that an actual optical device may comprise additional conventional structure.

The light source 12 has a spatial extent and may be one or more fluorescent lamps, aperture lamps, apertured cavities, or other lamps, or may be an array of lamps or relatively small sources. The term "spatial extent" is used herein to refer to one or more dimensions characterizing a light emission. For example, an extended light source may be a line source extended in one dimension, such as a fluorescent lamp, with an adjacent gap (i.e., having no light source) next to the line source. In an apertured cavity embodiment, such as a reflective enclosure containing one or more sources of light and one or more output apertures formed on the enclosure, the spatial extent refers to the spatial extent of the output aperture(s) rather than the spatial extent of the source(s) of light residing within the cavity.

The illumination apparatus 10 may be configured in an avionics display that includes any display element suitable for displaying various symbols and information conventionally shown in avionics displays. Many currently known monitors are suitable for this task, including various CRT and flat-panel display systems. The avionics display configuration may be based on a panel mounted display, a HUD projection, or any known technology. The avionics display suitably includes various graphical elements associated with the environment of an aircraft.

In one exemplary embodiment, the extended light source is extended in two dimensions rather than being a line source. For example, the extended light source may include two aperture lamps (16, 18) although any number of aperture lamps or other lamps may be used in an array configuration. The extended light source 12 may also be configured such that the lamps present a striped appearance or periodically occurring light patches from a two-dimensional perspective. For convenience of illustration, the illumination apparatus 10 is described herein using aperture lamps (16, 18), each having a respective aperture 17 through which light is emitted. In between the apertures 17 is a gap 19 which in combination with the light emission through the apertures 17 is a spatially modulated extended light source. Any variation in the combination of apertures and gaps may be used to configure the spatially modulated extended light source.

The polarization transducer 14 is positioned proximal to the light source 12 in a direction of propagation of the light emitted from the light source 12 and converts the unpolarized light from the extended light source 12 to light having a substantially single polarization. For example, the extended light source 12 may be an array of aperture lamps (16, 18) that are aligned in a plane and emit light with a general propagation direction orthogonal to such plane. The polarization transducer 14 is coextensive with spatial extent of the extended light source.

In one embodiment, the polarization transducer 14 is an array of polarizing beam splitters (PBSs) 20 that are each paired with a half-wave retarder 22, such as a half-wave plate or comparable polarization converter. In this example, each PBS 20 is aligned with a corresponding aperture lamp to capture light rays therefrom such that the number of PBSs matches the number of aperture lamps. In general, each PBS has a light-capturing surface that is coextensive with a corresponding aperture lamp. The PBS 20 splits an in-bound light ray bundle 24 having two orthogonal polarization states. The in-bound light ray bundle 24 is split into a first light ray bundle 26 having a first polarization state and a second light ray bundle 28 having a second polarization state orthogonal to the first polarization state.

The second light ray bundle 28 is then reflected and rotated by the half-wave retarder 22. An emerging light ray bundle 30 from the half-wave retarder 22 has a polarization state, i.e., the first polarization state, that is substantially similar to the polarization state of the first light ray bundle 26. Those of skill in the art will appreciate that a number of light ray bundles are emitted from the aperture lamp and transduced as previously mentioned with respect to the in-bound light ray bundle 24, the first light ray bundle 26, the second light ray bundle 28, and the emerging light ray bundle 30. The polarization transducer 14 has light exiting from the entire PBS array surface, which fills in the gaps between the apertures 17 of the lamps (16, 18). For example, the emerging light ray bundle 30 from the half-wave retarder 22 fills in the gap 19 between the apertures 17 of the lamps (16, 18).

In one exemplary embodiment, the gaps 19 of the extended light source 12 affect the light output of the extended light source 12 by creating regions of diminished illumination corresponding to the gaps 19, such as downstream from the extended light source along the propagation direction of the light output. In this embodiment, the emerging light ray bundles 30 illuminate these regions of diminished illumination corresponding to the gaps 19.

Figure 2:
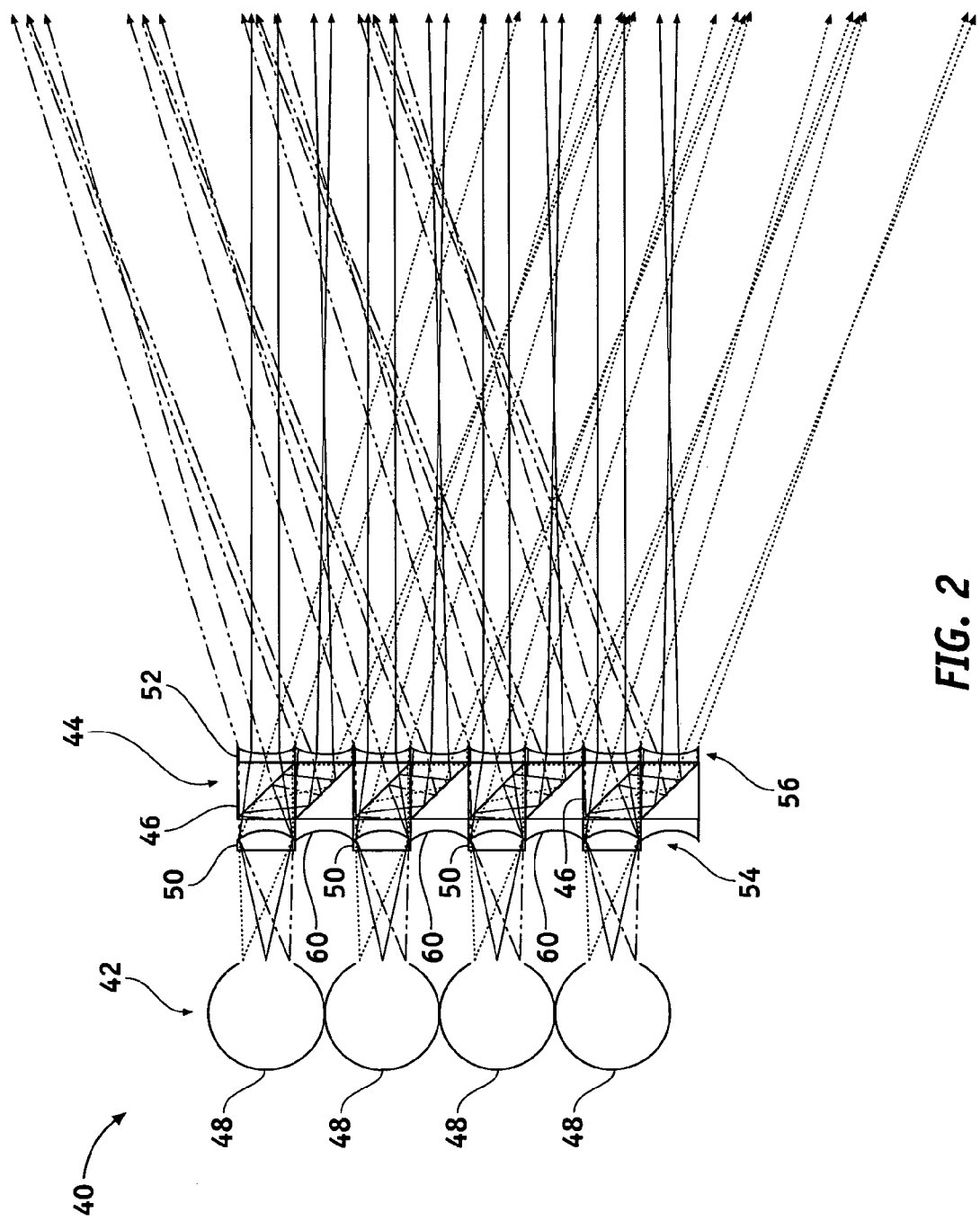
FIG. 2 is a schematic diagram of a second exemplary embodiment of an illumination apparatus.

FIG. 2 is a schematic diagram of a second exemplary embodiment of an illumination apparatus 40. In this embodiment, an array 42 of aperture lamps 48 provides a source of light ray bundles directed at an array 44 of PBSs 46. Each PBS 46 may be aligned with a corresponding aperture lamp 48 to capture light rays emitted therefrom. In one embodiment, the number of PBSs matches the number of aperture lamps. In general, each PBS has a light-capturing surface that is coextensive with a corresponding aperture lamp. For example, depending on a dimension(s) of extension of the aperture, each PBS may have a light-capturing surface that extends in the same dimension(s).

To assist in generally improving performance of the illumination apparatus 40, input lenses 50 and/or output lenses 52 may be coupled with the PBS array 42. In this embodiment, an array 54 of input lenses 50 is placed between the aperture lamp array 42 and the PBS array 44, and an array 56 of output lenses 52 is placed at a light-exiting surface of the PBS array 44. Each input lens 50 may be aligned with a corresponding aperture lamp 48 to capture light rays emitted therefrom. Similarly, each output lens 52 may be aligned with each transmitted light output from the polarization transducer 14, as shown in FIG. 1, depending on the configuration of the polarization transducer 14. For example, in a polarization transducer configuration having pairs of PBSs and half-wave retarders, a separate output lens may be aligned with each PBS and each half-wave retarder, as best shown in FIG. 2.

The location of either the input lens array 54 or the output lens array 56 may vary depending on angular variation of light output from the aperture lamp array 42. The input lenses 50 and output lenses 52 may be selected to minimize or eliminate vignetting that may occur as well as maintaining efficiency of the light output. For example, the input lenses may be configured to substantially collimate light emitted from the aperture lamp array, and the output lenses may be configured to mix the light output between each PBS while generally maintaining overall system efficiency.

In another embodiment, the illumination apparatus 40 may optionally include reflectors 60 positioned adjacent the input lenses to reflect light passing outside of the input lenses back to the aperture lamps to further improve efficiency. For example, the reflectors 60 may be simple cylindrical, flat, or spherical reflectors, or may take more complex forms such as corner cube arrays or cat's eye retro-reflectors. It is not critical to operation of the illumination apparatus that the light from a given aperture be directed back to the same aperture. The reflected light may be directed to a different aperture lamp to contribute to the luminance of such lamp. Alternately, the reflectors 60 may be diffusely reflective. A diffusely reflective cavity may be used in place of the reflectors for directing at least a portion of unused light back to the aperture lamps for recycling. For example, the diffuse cavity may be constructed around the illumination apparatus 40 to recirculate light and provide additional opportunities to contribute to the output of the illumination apparatus 40.

In another embodiment, the polarization transducer 14 (FIG. 1) is replaced with imaging optics that produce unpolarized light while providing light that fills in the gaps between apertures. For example, alternating 50/50 beam splitters coupled with reflectors may be used in place of the PBSs and half-wave retarders. This embodiment results in an unpolarized version of the illumination apparatus while continuing to provide light that fills in the gaps between the apertures of the aperture lamp array.

Additionally, light pipes or other non-imaging optics methods may be used to couple light from the lamps to the PBS array or other light transducer as previously discussed hereinabove, such as the configuration having 50/50 beam splitters and reflectors. Alignment of the light source with the polarization transducer or unpolarized light imaging optics, as well as any optional input and output lenses, may be accomplished by such light coupling devices.

As best shown in FIG. 2, the PBS array 44 illuminates the gaps between each light emission of the spatially modulated extended light source 44 to provide a substantially uniform light output. The exemplary embodiment shown in FIG. 2 may optionally include a diffusion screen, not shown, that is located after the PBS array 44 and output lenses 52 to further enhance the uniformity of illumination of the illumination apparatus 40. This diffusion screen may be polarization preserving and substantially transmissive.

Figure 3:
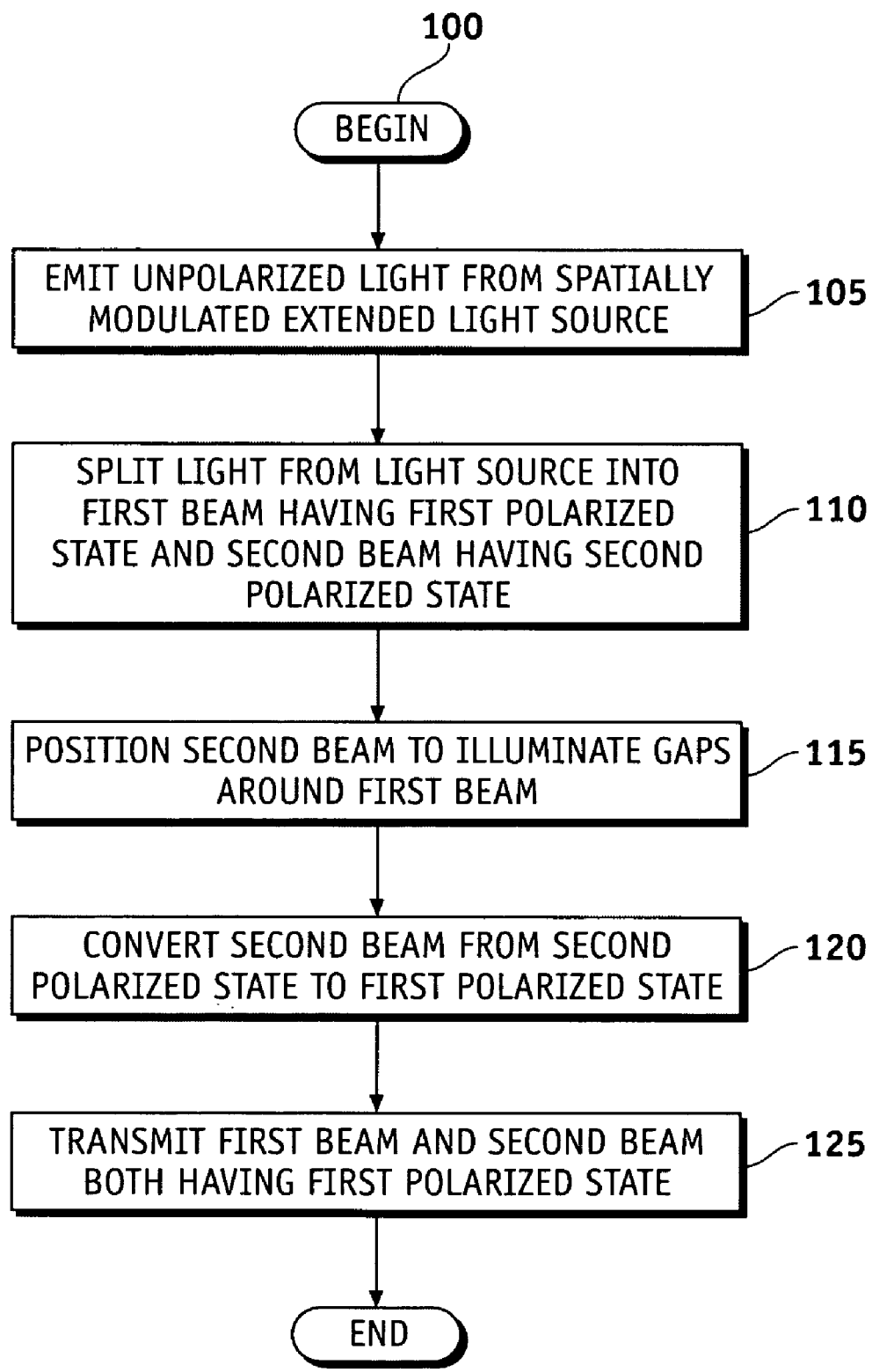
FIG. 3 is a flow chart of a method of illumination.

FIG. 3 is a flow chart of a method of illumination. The method begins at 100. Unpolarized light is emitted from a spatially modulated extended light source 12 (FIG. 1) at step 105. The extended light source 12 may have a plurality of periodic light emission apertures 17 (FIG. 1) as previously mentioned hereinabove, through which the unpolarized light is emitted.

The unpolarized light is split into the first beam 26 (FIG. 1) having the first polarized state and the second beam 28 (FIG. 1) having the second polarized state at step 110. In one embodiment, the PBS array 14 (FIG. 1) is used to split the unpolarized light. Each PBS 20 (FIG.1) of the PBS array 14 (FIG. 1) splits unpolarized light emitted from each lamp aperture 17 (FIG. 1) into the first and second beams. The first beam 26 (FIG. 1) is passed through each PBS 20 (FIG. 1).

The second beam 28 (FIG. 1) is translated and reflected, such as by the combination of the PBS array 14 (FIG. 1) and the half-wave retarder 22 (FIG. 1), to fill in the gaps 19 (FIG. 1) around the first beam 26 (FIG. 1) at step 115. This effectively fills in the gaps 19 (FIG. 1) of the spatially modulated extended light source 12 (FIG. 1).

The second beam 28 (FIG. 1) is converted from the second polarized state to the first polarized state at step 120. In one embodiment, each PBS 20 (FIG. 1) is coupled with a half-wave retarder 22 (FIG. 1). In this embodiment, the second beam 28 (FIG. 1) is reflected to the half-wave retarder 22 (FIG. 1) by the PBS 20 (FIG. 1). The half-wave retarder rotates the second beam 28 (FIG. 1) so that the emerging beam 30 (FIG. 1) has the first polarization state.

The first beam 26 (FIG. 1) and the emerging beam 30 (FIG. 1), based on the second beam 28 (FIG. 1), both have substantially similar polarization states, i.e., the first polarization state, and are transmitted at step 125. The light output of the illumination apparatus 10 is substantially uniform due to the combination of the first beam 26 (FIG. 1) and the emerging beam 30 (FIG. 1) that illuminates the diminished regions of illumination resulting from the gaps 19 (FIG. 1) around the first beam 26 (FIG. 1).

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. An illumination apparatus comprising:
a spatially modulated extended light source configured to project an output having at least one region of diminished illumination, said light source comprising:
at least two light outputs aligned in a plane and configured to project unpolarized light along a propagation direction orthogonal to said plane; and
at least one gap interspersed between said at least two light outputs; and
an array of polarizing beam splitters (PBSs) positioned proximal to said spatially modulated extended light source, said array of PBSs configured to:
receive said output from said light source;
convert said unpolarized light to light having a first polarized state; and
remove said at least one region of diminished illumination.

2. An illumination apparatus according to claim 1, wherein each PBS of said array of PBSs comprises a half-wave retarder, each PBS of said array of PBSs configured to split said unpolarized light into a first beam having said first polarized state and a second beam having a second polarized state, each PBS of said array of PBSs further configured to transmit said first beam and reflect said second beam to a respective half-wave retarder, each half-wave retarder configured to convert said second beam to said first polarized state and transmit said second beam with said first polarized state.

3. An illumination apparatus according to claim 1 further comprising an array of input lenses positioned adjacent said array of PBSs such that said array of input lenses is between said spatially modulated extended light source and said array of PBSs, wherein each lens of said array of input lenses is positioned adjacent a respective PBS.

4. An illumination apparatus according to claim 3 further comprising an array of paired output lenses positioned adjacent said array of PBSs such that said array of PBSs is between said spatially modulated extended light source and said array of paired output lenses, wherein each paired output lenses of said array of paired output lenses is positioned adjacent a respective PBS.

5. An illumination apparatus according to claim 1, wherein said spatially modulated extended light source is selected from aperture lamps, light emitting diodes (LEDs), apertured cavities, and fluorescent lamps.

6. An illumination apparatus according to claim 1, wherein said spatially modulated extended light source comprises at least two aperture lamps, and said array of PBSs comprises at least two PBSs, each of said at least two aperture lamps having a quadrilateral aperture configured to emit light to a corresponding PBS of said array of PBSs, each of said array of at least two PBSs having a rectangular profile corresponding to said quadrilateral aperture.

7. An illumination apparatus according to claim 3 further comprising an array of reflectors configured to reflect light passing outside of each of said array of input lenses, each of said array of reflectors positioned between input lenses of said array of input lenses.

8. An avionics display comprising:
a spatially modulated extended light source configured to project an output, said light source comprising:
at least two illuminating regions configured to project a plurality of unpolarized light ray bundles; and
at least one non-illuminating region interspersed among said at least two illuminating regions;
a plurality of polarizing beam splitters (PBSs) configured to:
receive said output from said spatially modulated light source;
convert said plurality of unpolarized light ray bundles to a plurality of polarized light ray bundles having a single polarization state; and
remove said at least one non-illuminating region; and
a diffusing screen configured to receive said plurality of polarized light ray bundles having said single polarization state from said plurality of beam splitters.

9. An avionics display according to claim 8, wherein said plurality of PBSs comprises:
a plurality of beam splitters configured to receive said output from said spatially modulated extended light source, each of said plurality of beam splitters configured to separate said unpolarized light ray bundles into a first group of light ray bundles having a first polarized state and a second group of light ray bundles having a second polarized state, said first group of light ray bundles passing through said beam splitter; and
a plurality of half-wave retarders coupled to said plurality of beam splitters such that each of said plurality of half-wave retarders is coupled to a corresponding beam splitter of said plurality of beam splitters, each of said plurality of half-wave retarders configured to:
receive said second group of light ray bundles;
convert said second polarized state of said second group of light ray bundles to said first polarized state; and
output said second group of light ray bundles having said first polarized state, said plurality of beam splitters and said plurality of half-wave retarders thereby together configured to remove said at least one non-illuminating region.

10. An avionics display according to claim 9 further comprising an plurality of input lenses, each input lens of said plurality of input lenses positioned adjacent a corresponding beam splitter of said plurality of beam splitters such that said plurality of input lenses is between said spatially modulated extended light source and said plurality of beam splitters, said plurality of input lenses configured to collimate said unpolarized light ray bundles.

11. An avionics display according to claim 9 further comprising a plurality of paired output lenses, each pair of output lenses of said plurality of paired output lenses positioned adjacent a corresponding beam splitter of said plurality of beam splitters such that said plurality of beamsplitters is between said spatially modulated extended light source and said plurality of paired output lenses, said plurality of paired output lenses configured to mix said first group of light ray bundles from said plurality of beam splitters and said second group of light ray bundles from said plurality of half-wave retarders.

12. An avionics display according to claim 8, wherein said spatially modulated extended light source is selected from aperture lamps, light emitting diodes (LEDs), and fluorescent lamps.

13. An avionics display according to claim 10 further comprising a plurality of reflectors configured to reflect unpolarized light ray bundles passing outside of each of said plurality of input lenses, each of said plurality of reflectors positioned between input lenses of said plurality of input lenses.

14. An illumination apparatus comprising:
a spatially modulated extended light source comprising a plurality of light emission apertures aligned in a plane and at least one periodically occurring gap interspersed between said plurality of light emission apertures, said spatially modulated extended light source configured to project a light output in a propagation direction orthogonal to said plane, said light output comprising:
at least two first regions having a first unpolarized illumination; and
at least one second region having a second unpolarized illumination interspersed between said at least two first regions, said first unpolarized illumination greater than said second unpolarized illumination;
a plurality of polarizing beam splitters (PBSs) positioned in said propagation direction and configured to receive said light output from said spatially modulated extended light source, project a polarized light output in said propagation direction, and illuminate said at least one second region.

15. An illumination apparatus according to claim 14, wherein said plurality of PBSs comprises:
a plurality of beam splitters positioned in said propagation direction and configured to receive said light output from said spatially modulated extended light source, each of said plurality of beam splitters configured to separate said unpolarized illumination into a first beam having a first polarized state and a second beam having a second polarized state, said first beam passing through said beam splitter;
a plurality of half-wave retarders coupled to said plurality of beam splitters such that each of said plurality of half-wave retarders is coupled to a corresponding beam splitter of said plurality of beam splitters, each of said plurality of half-wave retarders configured to:
receive said second beam;
convert said second polarized state of said second beam to said first polarized state; and
output said second beam having said first polarized state, said plurality of beam splitters and said plurality of half-wave retarders thereby together configured to illuminate said at least one second region of said light output of said spatially modulated extended light source.

16. An illumination apparatus according to claim 14, wherein said spatially modulated extended source projects said light output at an angle of less than or about ±25° from an axis aligned with said propagation direction.

17. An illumination apparatus according to claim 14, wherein said spatially modulated extended light source comprises:
a plurality of periodically occurring gaps interspersed between said plurality of light emission apertures.

18. An illumination apparatus according to claim 15 further comprising a plurality of reflectors coupled with said plurality of beam splitters, said plurality of reflectors configured to reflect light passing outside of each of said plurality of beam splitters, said plurality of reflectors positioned between said plurality of beam splitters and said spatially modulated extended light source.

19. A method of illumination comprising the steps of:
splitting unpolarized light emitted from each light emission aperture of a spatially modulated extended light source into a first beam having a first polarized state and a second beam having a second polarized state, the spatially modulated extended light source having a plurality of light emission apertures aligned in a plane and having at least one periodically occurring gap interspersed between the plurality of light emission apertures;
converting the second beam from the second polarized state to the first polarized state; and
transmitting the first beam having the first polarized state and the second beam having the first polarized state.

20. A method of illumination according to claim 19, wherein said splitting step comprises the steps of:
splitting the unpolarized light with a polarizing beam splitter; and
passing the first beam through the polarizing beam splitter.

21. A method of illumination according to claim 19, wherein said converting step comprises the step of reflecting the second beam to a half-wave retarder.

\* \* \* \* \*

UNITED STATES PATENT AND TRADEMARK OFFICE
CERTIFICATE OF CORRECTION

PATENT NO. : 7,198,370 B2  Page 1 of 1
APPLICATION NO. : 10/930418
DATED : April 3, 2007
INVENTOR(S) : Dubin et al.

It is certified that error appears in the above-identified patent and that said Letters Patent is hereby corrected as shown below:

Column 8, line 50, claim 10, "an" should be changed to --a--.

Signed and Sealed this

Thirty-first Day of July, 2007

JON W. DUDAS
*Director of the United States Patent and Trademark Office*